J. MILLER.
ELECTRIC WAFFLE STOVE.
APPLICATION FILED NOV. 8, 1915.
1,255,771.
Patented Feb. 5, 1918.
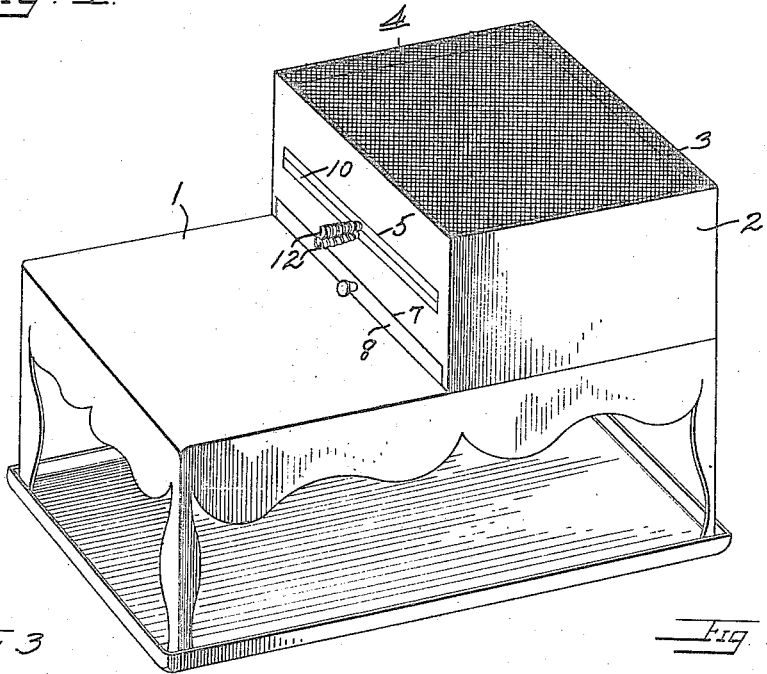
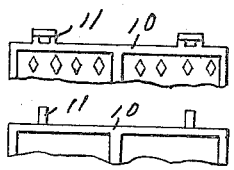
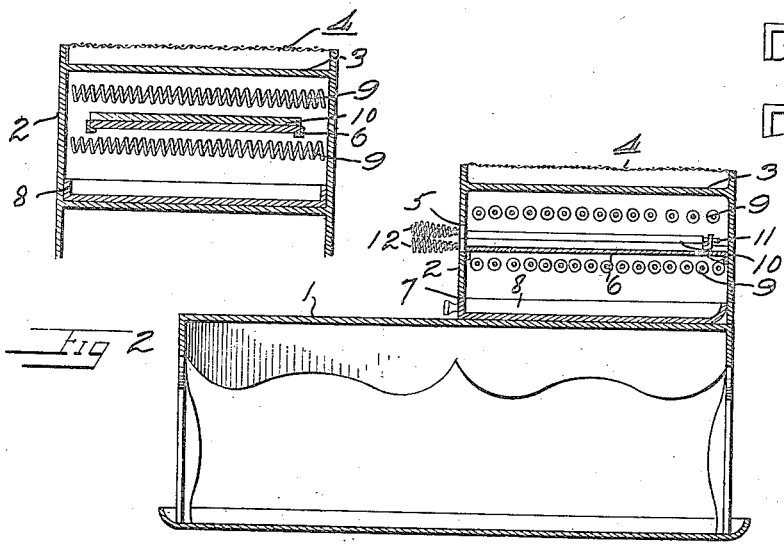
Inventor
Joseva Miller
By Geo. P. Kimmel
Attorney

UNITED STATES PATENT OFFICE.

JOSEVA MILLER, OF PASADENA, CALIFORNIA.

ELECTRIC WAFFLE-STOVE.

1,255,771. Specification of Letters Patent. Patented Feb. 5, 1918.

Application filed November 3, 1915. Serial No. 60,326.

*To all whom it may concern:*

Be it known that I, JOSEVA MILLER, a citizen of the United States, residing at Pasadena, in the county of Los Angeles and State of California, have invented certain new and useful Improvements in Electric Waffle-Stoves, of which the following is a specification.

This invention relates to improvements in electric waffle stoves.

The object of my invention is to provide an electrically heated stove especially adapted for use in baking waffles. The conventional type of waffle iron is a cumbersome utensil which must be watched constantly and turned in order to bake the waffles on both sides, thereby consuming an excessive amount of heat and time in the operation. With my device a comparatively light waffle container is used, which may be made of thin iron or aluminum, and the stove is so arranged that heat is applied to both sides of the waffles at the same time.

Furthermore, my stove is provided with a plate warmer whereby the escaping heat is utilized; also a tray to catch drippings, and a stand upon which to rest the waffle iron when emptying or refilling the same. My stove may also be used as a bread toaster.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claim appended hereunto and forming a part of this application.

Referring now to the drawings, which are merely illustrative of my invention,

Figure 1 is a perspective view of my stove and waffle iron in operative position.

Fig. 2 is a longitudinal sectional view thereof.

Fig. 3 is a transverse vertical sectional view taken on the line 3—3 of Fig. 2.

Fig. 4 is a fragmental detail view showing the loose hinge of the waffle iron.

Referring further to the drawings, wherein similar reference characters designate similar parts throughout the respective views, 1 is a rectangular metallic stand, having a rectangular casing 2 mounted upon one end thereof, said casing being solidly inclosed by a roof portion 3 above which the walls of the casing extend. Interposed between said walls at the top thereof is a removable wire mesh covering 4. An elongated slot 5 is provided centrally through the front wall of said casing, and angle-iron guide members 6 are secured within the casing, extending from the front to the rear wall, being horizontally mounted at a point adjacent the lower edge of said slot.

A relatively wider slot 7 is provided in the front wall of the casing adjacent the lower edge thereof, and a tray 8, coextensive in size with said slot is adapted to slide therein.

A plurality of electric coils 9 are interposed between the side walls of said casing, being successively placed along the length thereof; one set of said wires being spaced apart below said guide members 6 and the other set being spaced apart above the slot 5.

A rectangular waffle iron 10, formed of two halves, each having a coöperative loose hinge 11 that may readily be disengaged, is adapted to fit within the slot 5 and rest upon the guide members 6. Each half of said iron is provided with a coiled wire handle 12 which will always remain relatively cool so that it may be handled without burning the hands.

In use, the article or articles to be baked are placed between the two halves of the waffle iron 10, the projections of the upper half being engaged in the complementally formed ears of the lower half. In this form the waffle iron is inserted through the slot 5, into the housing 2, between the heating elements 9. The tray 8, may be used for baking pies and the like.

The utility, adaptability, and advantages of my improved form of electric waffle stoves being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof, not departing in principle from my invention, and falling within the purview of the appended claim.

What I claim as my invention and desire to secure by Letters Patent is:

In a device of the class described, the combination of a stand, a rectangular casing mounted upon one end of the stand, the front wall of said casing having an elongated slot therein, a horizontal partition in said casing adjacent the upper marginal edge thereof, angle iron guide members horizontally mounted adjacent the lower edge of the slot and extending therefrom to the rear wall forming guide members, a rectangular waffle iron slidably mounted in said guide members, the lower edge of the front wall having an elongated slot formed therein, a tray member slidable in said slot, the upper surface of the stand providing a supporting surface for said tray member when in closed position, a plurality of electric coils interposed between the walls of the said casing above and below the guide members, and a removable wire mesh mounted on the top of said casing for a purpose specified.

In testimony whereof I affix my signature hereto.

JOSEVA MILLER.